May 1, 1934. H. T. WHEELER 1,956,843
MEANS FOR INSTALLING PACKING IN STUFFING BOXES
Filed July 30, 1930
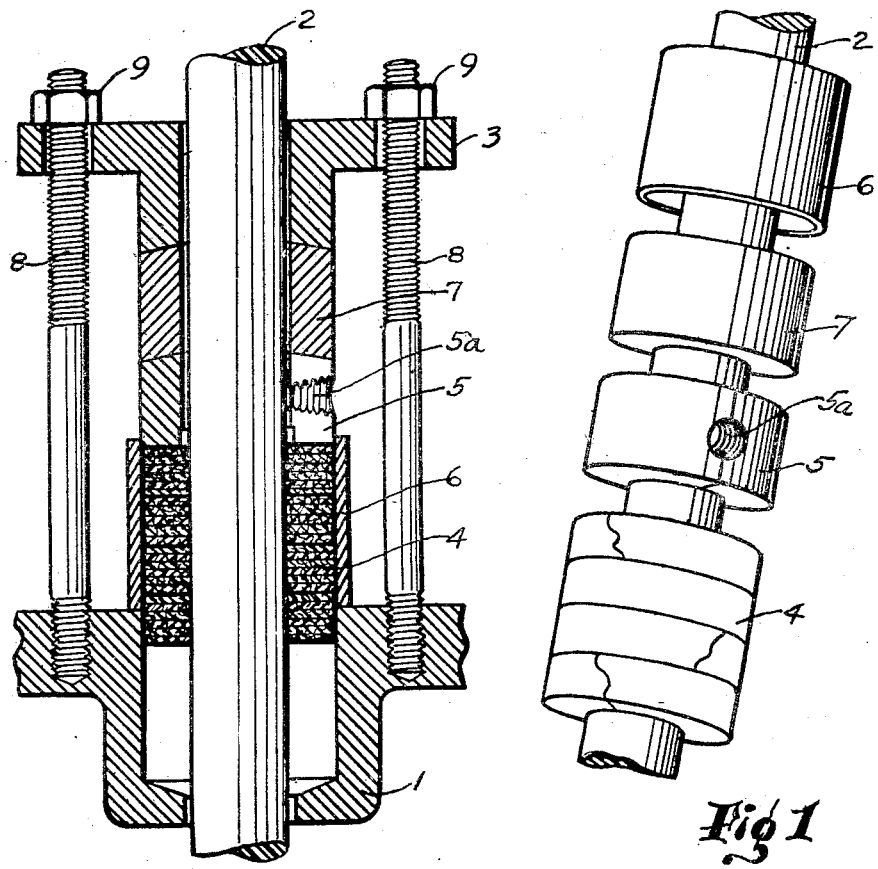
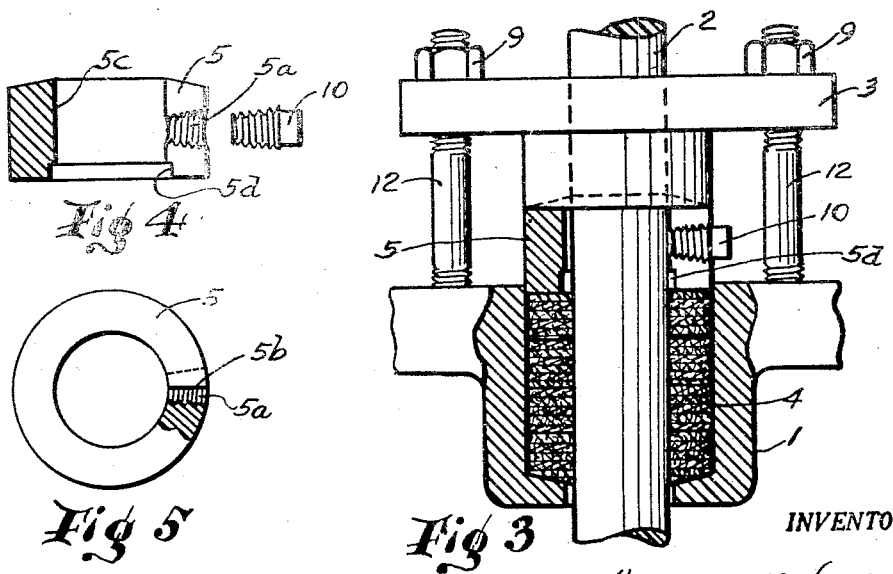
INVENTOR.
Harley T Wheeler Patented May 1, 1934

1,956,843

UNITED STATES PATENT OFFICE 1,956,843

MEANS FOR INSTALLING PACKING IN STUFFING-BOXES

Harley T. Wheeler, Dallas, Tex., assignor to Elizabeth Wheeler, Dallas, Tex.

Application July 30, 1930, Serial No. 471,830

5 Claims. (Cl. 286—31)

This invention relates to certain new and useful improvements in tools and the method of inserting packing in a stuffing-box. The chief advantage is to install a new set of packing after the old packing has been removed.

Another advantage is that sections of packing may be assembled in their proper relation outside of the stuffing-box, and then forced into the stuffing-box against any pressure that may be accumulating in the stuffing-box chamber.

A further advantage is the use of an expanding collar which holds the packing in place while the loading tools are being replaced.

A still further and important advantage is that a full set of packing may be removed from the stuffing-box which has been equipped with the expanding collar, under full pressure on the valve and without damage to the packing.

With these advantages in view, and other objects which will become apparent as the description proceeds the invention will be readily understood by reference to the accompanying drawing, wherein:

Figure 1 is a perspective view of the packing rings and the loading tools, assembled on a valve stem.

Figure 2 is a cross-sectional view of a stuffing-box being filled with packing according to this invention.

Figure 3 is a cross-section of the packing in place in a stuffing-box.

Figure 4 is a cross-sectional view of the expanding collar.

Figure 5 is a plan view of the expanding collar.

Referring now especially to Figure 1, which shows that portion of a valve stem 2 which extends outside and beyond the stuffing-box 1. It is to be understood that this stem or shaft 2 may be of any size or construction which requires a packing to form a seal between the stem and its supporting structure. Any number of required packing rings 4 are assembled on the stem 2 in proper alignment with the joints lapped and staggered. A split collar 5 is next placed over the stem, immediately to be followed by a spacing ring 7. The collar and ring, 5 and 7, are either the same size or slightly less in diameter than the stuffing-box bore. Lastly, the hollow sleeve 6, which is slightly larger than the stuffing-box bore is placed on the stem preparatory to being slipped over collars 5 and 7, to house the packing rings 4.

In Figure 2 is shown a cross-section of a stuffing-box 1, the portion of the valve stem 2 which extends outside and beyond the stuffing-box 1 also being that part of stem 2 shown in the perspective, Figure 1. Figure 2 shows the sleeve 6 which has been passed over the ring 7 and collar 5 and is forming a housing, or an external stuffing-box for the rings 4. The packing gland 3 is placed over the stem and held in place by long threaded bolts 8, 8, and tightened by nuts 9, 9. It may now be seen that pressure may be exerted on the packing by tightening nuts 9, 9, which force gland 3 against spacing collar 7, pushing split collar 5 against the packing rings 4, the latter then moving into the stuffing-box chamber 1. Should any pressure be escaping thru the stuffing-box 1, it will now accumulate against the packing rings. To overcome this pressure, it is only necessary to advance nuts 9, 9, thus moving the assembly of gland 3, spacing collar 7, split collar 5 and packing set rings 4 until the stuffing-box is filled.

Referring now to Figures 4 and 5. Before the split collar 5 is machined it is slotted along line 5b then the material is hammered or pressed so that the slot is closed. After being machined to its dimensions a taper threaded hole 5a is made with its center line in the joint as is more clearly shown at 5a, of Figure 1. The upper part of split collar 5 is made a close fit to the stem to provide a bearing which will maintain the valve-stem on the centerline of the stuffing-box bore. The inner part of the split collar 5 is recessed at 5d for clearance to assist the impressed pressure to increase the contact of the packing against the stem. Plug 10 is a taper threaded screw, a fit to the taper hole 5a in split collar 5, and is to be used as will be shown later, to expand the split collar in the mouth of the stuffing-box.

Referring now especially to Figure 2, after the packing rings 4 have been forced into the stuffing-box chamber 1, sleeve 6 will house the split collar 5, the spacing collar 7 and part of the shank of the packing gland 3. To remove collar 7 and take out the long threaded bolts 8, 8, the sleeve 6 is pulled upward to expose the threaded hole 5a. Now plug 10 is screwed into the hole 5a tightly enough to expand the split collar 5 against the mouth of the stuffing-box 1. The expanding split collar 5 then takes the thrust of the pressure against the rings 4. Packing gland 3 may be removed, spacing collar 7 taken off, and long threaded bolts 8, 8, removed.

Referring now especially to Figure 3, while the split collar 5 is expanded against the wall of stuffing-box 1, holding the packing rings 4 in place, permanent bolts 12, 12 are installed and the gland 3 is replaced on the stem and held against the split collar 5 by nuts 9, 9. The taper plug 10 is loosened or removed and the packing gland 3 used to adjust the set of packing for tightness.

In operation this invention is mainly used to remove all old packing and to force a new set of packing into a stuffing-box against any pressure which may be escaping. Altho gate valves and other devices using packing have stop collars and similar means to stop any pressure escaping from the interior into the stuffing-box while it is being repacked, these devices rarely ever are pressure tight. To attempt to force a set of packing into a stuffing-box one ring at a time, or to wind a string of packing around the stem and force it into place, is to have it blown out as fast as sufficient pressure accumulates. And any method of pushing rings into a box against escaping pressure, other than by an orderly method such as is covered by this invention, will disarrange the packing and result in a poor job and a leaking joint.

Packing rings 4 installed by this method are systematically arranged on the stem 2 outside of and beyond the mouth of the stuffing-box 1, then the entire set is forced into the stuffing-box 1, the external sleeve 6 keeping the rings in alignment and the split collar 5 compressing them evenly against the pressure until the set occupies the chamber. A great share of efficiency and the length of service from packing is obtained by putting packing into a stuffing-box in an orderly manner without damaging it before it goes into service. As valves are commonly constructed and operated the stem has no rigid support at the outer end other than the packing which is compressed against it. By this invention, the split collar 5 with its close fitting bearing surface 5c forms a guide for the stem immediately above the stuffing-box mouth and protects the packing from side thrusts and rough handling. Less tension is required to keep the packing tight when the stem is centralized with the stuffing-box bore and elasticity and tightness are maintained for a longer period of time.

Manifestly the construction illustrated is capable of considerable variation to meet different valve designs to control different temperatures and pressures, and such variations as are within the scope of the appended claims are considered within the spirit of this invention.

I claim:

1. A packing assembly of the type to be set as a renewal packing in a supporting structure about a stem or shaft where the pressure which is to be sealed is present when the packing is being positioned, said assembly including a plurality of layers of packing material, an expandable retaining collar thereon, means in said collar to expand it against the supporting structure to temporarily hold the packing in position, and a gland to engage said collar to permanently hold the assembly in position, said means being accessible to release said retaining collar after said gland engages said collar.

2. An assembly for installing packing in a stuffing box under conditions where pressure cannot be relieved, comprising an annulus disposed about the bore of the stuffing box and to receive the packing material, a split ring seated on the packing material, means to force the packing and split ring into the stuffing box, and means to expand said split ring into positive engagement with the wall of the stuffing box.

3. An assembly for installing packing in a stuffing box under conditions where pressure cannot be relieved, comprising an annulus disposed about the bore of the stuffing box and to receive the packing material, a split ring seated on the packing material, means to force the packing and split ring into the stuffing box, means to expand said split ring into positive engagement with the wall of the stuffing box, and additional means to permanently retain said ring in engagement with the packing.

4. An assembly for installing packing against pressure in stuffing boxes including means adapted for attachment to the stuffing box, an expandable collar and packing material adapted to be forced into the stuffing box against the pressure in said box, and additional means connected to said first means to apply pressure to said collar, a sleeve to guide said collar and material into the stuffing box, said sleeve being movable so that said collar may be expanded.

5. A method of installing packing in stuffing boxes where the pressure has not been relieved including positioning the packing and a retaining collar adjacent the mouth of the stuffing box, forcing the packing material and collar into the stuffing box against the pressure, temporarily fastening the collar in the entrance of the stuffing box to hold the packing against the pressure, and replacing the packing gland so that it engages the collar.

HARLEY T. WHEELER.